US011231272B2

(12) United States Patent
Akagawa et al.

(10) Patent No.: US 11,231,272 B2
(45) Date of Patent: Jan. 25, 2022

(54) OPTICAL MEASURING APPARATUS AND OPTICAL MEASURING METHOD

(71) Applicants: NEC CORPORATION, Tokyo (JP); NATIONAL UNIVERSITY CORPORATION KAGAWA UNIVERSITY, Takamatsu (JP)

(72) Inventors: Takeshi Akagawa, Tokyo (JP); Masahiro Kubo, Tokyo (JP); Katsumi Abe, Tokyo (JP); Ersin Altintas, Tokyo (JP); Yuji Ohno, Tokyo (JP); Tetsuri Ariyama, Tokyo (JP); Ichiro Ishimaru, Takamatsu (JP)

(73) Assignees: NEC CORPORATION, Tokyo (JP); NATIONAL UNIVERSITY CORPORATION KAGAWA UNIVERSITY, Takamatsu (JP)

( * ) Notice: Subject to any disclaimer, the term of this patent is extended or adjusted under 35 U.S.C. 154(b) by 0 days.

(21) Appl. No.: 16/764,526

(22) PCT Filed: Oct. 30, 2018

(86) PCT No.: PCT/JP2018/040225
§ 371 (c)(1),
(2) Date: May 15, 2020

(87) PCT Pub. No.: WO2019/098005
PCT Pub. Date: May 23, 2019

(65) Prior Publication Data
US 2020/0333128 A1  Oct. 22, 2020

(30) Foreign Application Priority Data

Nov. 16, 2017 (JP) .............................. JP2017-220971

(51) Int. Cl.
*G01B 9/02* (2006.01)
*G01J 3/45* (2006.01)

(52) U.S. Cl.
CPC ............ *G01B 9/02091* (2013.01); *G01J 3/45* (2013.01)

(58) Field of Classification Search
CPC ............ G01B 9/02024; G01B 9/02091; G01B 9/02076; G01B 9/02077; G01B 9/02084; G01J 3/45
See application file for complete search history.

(56) References Cited

U.S. PATENT DOCUMENTS

| 4,385,835 A * | 5/1983 | Westerberg ........ G01B 9/02067 356/498 |
| 10,206,580 B2 * | 2/2019 | Lee ...................... A61B 5/0066 |

(Continued)

FOREIGN PATENT DOCUMENTS

| JP | 03-097608 U | 10/1991 |
| JP | 2007-114160 A | 5/2007 |

(Continued)

OTHER PUBLICATIONS

"Biomedical Photonics—Biomedical Optical Foundation and Application", Journal of Next-Generation Medical Laser Applied Technology, The Institute of Electrical Engineers of Japan, Ohmsha, Ltd, Apr. 30, 2009, pp. 126-129.

(Continued)

*Primary Examiner* — Tarifur R Chowdhury
*Assistant Examiner* — Jonathon Cook
(74) *Attorney, Agent, or Firm* — Sughrue Mion, PLLC

(57) ABSTRACT

Optical measuring apparatus includes: a light source irradiating an object to be measured; a splitter splitting transmitted light or reflected light from the object to be measured; a phase changer changing a phase of a first light which is one (Continued)

of the lights split; a phase fixer maintaining a phase of a second light which is the other light split; a multiplexer multiplexing lights output from the phase changer and the phase fixer; a detector detecting the light (interference image) output from the multiplexer; and a controller that extracts a reference point from the interference image, when a displacement of the reference point is detected, corrects a luminance value for each pixel of the interference images in accordance with a displacement of the object to be measured indicated by a displacement of the reference point, constructs an interferogram based on the luminance value for each pixel of the interference images after the correction.

8 Claims, 12 Drawing Sheets

(56) References Cited

U.S. PATENT DOCUMENTS

| | | | | |
|---|---|---|---|---|
| 2004/0150832 | A1* | 8/2004 | Mermelstein | G01B 9/02014 356/497 |
| 2007/0242277 | A1 | 10/2007 | Dolfi et al. | |
| 2007/0252951 | A1* | 11/2007 | Hammer | G01B 9/02068 351/221 |
| 2010/0110172 | A1* | 5/2010 | Satake | G01B 9/0203 348/78 |
| 2010/0280321 | A1 | 11/2010 | Modell | |
| 2013/0120755 | A1* | 5/2013 | Harig | G01J 3/45 356/455 |
| 2013/0222566 | A1* | 8/2013 | Murase | A61B 3/113 348/78 |
| 2014/0029826 | A1* | 1/2014 | Pintal | A61B 3/102 382/131 |
| 2015/0049343 | A1* | 2/2015 | Shaked | G01B 9/02054 356/503 |
| 2017/0000327 | A1* | 1/2017 | Fingler | A61B 3/0025 |

FOREIGN PATENT DOCUMENTS

| | | |
|---|---|---|
| JP | 2007-127425 A | 5/2007 |
| JP | 2008-039651 A | 2/2008 |
| JP | 2009-198205 A | 9/2009 |
| JP | 4389032 B2 | 12/2009 |
| JP | 2011-215084 A | 10/2011 |
| JP | 2012-10960 A | 1/2012 |
| JP | 5078004 B2 | 11/2012 |
| JP | 5478840 B2 | 4/2014 |
| JP | 2015-31831 A | 2/2015 |
| JP | 2016-008956 A | 1/2016 |

OTHER PUBLICATIONS

International Search Report for PCT/JP2018/040225, dated Jan. 29, 2019.

* cited by examiner

OPTICAL MEASURING APPARATUS AND OPTICAL MEASURING METHOD

CROSS REFERENCE TO RELATED APPLICATIONS

This application is a National Stage of International Application No. PCT/JP2018/040225 filed Oct. 30, 2018, claiming priority based on Japanese Patent Application No. 2017-220971 filed Nov. 16, 2017 and incorporates by citation all of the disclosures of this application.

TECHNICAL FIELD

The present invention relates to an optical measuring apparatus and an optical measuring method.

BACKGROUND OF THE INVENTION

In recent years, various types of optical measuring apparatus using optical interference have been developed. For example, a Fizeau interferometer or a Mach-Zehnder interferometer which have a simple configuration have been used for high-precision plane measurement or high-precision spherical measurement. An optical measuring apparatus using a Fizeau interferometer is disclosed in, for example, Patent Document 1.

In the optical measuring apparatus described in Patent Document 1, a laser beam is irradiated to a reference master through a beam splitter and a collimator lens, and a subject is also irradiated through the reference master, and reflected light from a reference surface of the reference master and reflected light from a surface of the subject are converged on a translucent screen through a collimator lens and a beam splitter. Behind the screen, a light spot imaging lens and an interference fringe imaging lens are arranged so as to be interchangeable on an optical path, and a solid-state imaging device is arranged at a focal position of the light spot imaging lens. Then, by photographing the light spot image on the screen using the solid-state imaging device, the interference fringes that have been transmitted through the screen can be observed by the interference fringe imaging lens.

Optical coherence tomography (OCT) is used for fundus examination and the like. OCT is a technique capable of non-invasively imaging and visualizing (imaging) a tomographic image from a biological epidermis to a depth of about 1 to 2 mm with a spatial resolution of about 10 μm.

OCT is based on a Michelson interferometer using low coherence light. The OCT irradiates a living tissue with light, selectively detects a straight-advancing light component reflected inside the tissue, and forms a two-dimensional or three-dimensional tomographic image based on the reflected light component. For example, Non-Patent Document 1 describes a conceptual diagram showing a basic configuration of OCT. FIG. 1 cites FIG. 5.1 of Non-Patent Document 1.

As shown in FIG. 1, OCT includes a light source, a reference light mirror, a beam splitter and a photodetector. The object to be measured is, for example, a living body.

The light source outputs low coherence light in the near infrared region. The low coherence light is light having extremely low temporal coherence. A super luminescent diode (SLD) is used as the light source, for example.

As shown in FIG. 1, the low coherence light emitted from the light source is irradiated to the beam splitter. The low coherence light emitted from the light source is, for example, light having a center wavelength of 850 nm and a full width at half the maximum of the spectrum of 20 nm.

The light emitted from the light source is split by the beam splitter, and one of the lights split by the beam splitter is reflected by the reference mirror and then returned to the beam splitter as the reference light ER. The other light split by the beam splitter is irradiated to the object to be measured. The light irradiated on the object to be measured is reflected by the surface and inside of the object to be measured, and returns to the beam splitter as reflected light (signal light) ES (e.g., reflected light ESA, ESB). Since the reference light ER and the reflected light ES returning to the beam splitter correspond with each other in optical paths, they are combined in front of the photodetector.

As shown in FIG. 1, when the surface (reflection surface) of the object to be measured in the propagation direction of the signal light is A and the predetermined reflection surface inside the object to be measured is B, if reflection surface A of the object to be measured and position 1 of the reference light mirror are optically equidistant with respect to the beam splitter, the sine wave vibrations of the reference light ER1 and the reflected light ESA overlap and both interfere with each other. As a result, the photodetector detects the interference light between the reference light ER1 and the reflected light ESA.

On the other hand, when the reference light mirror is moved away from the beam splitter to position 2 equidistant from reflection surface B, the sine wave vibrations of reference light ER2 and reflection light ESB overlap and both interfere with each other. As a result, the photodetector detects the interference light between reference light ER2 and reflected light ESB. At this time, if the interference light is detected by the photodetector while continuously moving the reference light mirror, the intensity distribution of the reflected light in the optical axis direction can be obtained.

As described above, there are various types of optical measuring apparatuses that utilize optical interference, and the optical measuring apparatuses are selectively used according to their purposes.

However, in the optical measuring apparatus described in Patent Document 1, since it is necessary to arrange the light spot imaging lens and the interference fringe imaging lens so as to be interchangeable on the optical path, there is a problem that the configuration becomes complicated and the number of components increases.

Further, in the optical measuring apparatus described in Patent Document 1, since the operation of replacing the light spot imaging lens and the interference fringe imaging lens is must be performed every time between the optical axis adjustment step and the interference fringe observation step, there is a problem that the measurement cannot be performed quickly when the subject is frequently replaced and measured.

An example of a technique for solving such a problem is disclosed in Patent Document 2.

Patent Document 2 discloses an interferometer in which coherent light from the same light source is irradiated onto a reference surface of a reference lens and a surface of a subject (object to be measured), and the reference light reflected on the reference surface and the measurement light reflected on the surface of the subject are overlapped and interfered to form an interference light flux, and an image of an interference fringe of the interference light flux is observed.

The interferometer described in Patent Document 2 includes: a diaphragm plate having a reflection surface formed on a surface of a side of an incident direction of an interference light flux, and an aperture for transmitting the interference light flux formed in a central portion of the reflection surface; a half mirror surface arranged to face a reflection surface of the diaphragm plate on an optical path of the interference light flux; a converging optical system for converging the light transmitted through the aperture of the diaphragm plate; and an imaging unit for photographing the light converged by the converging optical system, the converging optical system being provided so that the reflection surface of the diaphragm plate and the imaging surface of the imaging unit have a conjugate relationship with each other via the half mirror surface.

In the interferometer described in Patent Document 2, when the optical axis of the reference surface of the reference lens corresponds with the optical axis of the surface of the subject (object to be measured), the interference light beam passes through the half mirror surface and the aperture of the diaphragm plate and is converged by the converging optical system, so that the interference fringes are photographed by the imaging unit.

Further, when the optical axis of the reference surface of the reference lens does not correspond with the optical axis of surface of the subject (object to be measured), the optical axis of the reference light reflected by the reference surface and the optical axis of the measurement light reflected by the surface of the subject are shifted, so that at least one of the lights reaches the reflection surface of the diaphragm plate and a component is generated which is reflected on the half mirror surface side. The reflected light component on the reflection surface reaches the half mirror surface, and a part thereof passes through the aperture of the diaphragm plate, and is converged by the converging optical system.

Since the converging optical system is provided so that the reflective surface of the diaphragm plate and the imaging surface of the imaging unit have a conjugate relationship via the half mirror surface, the imaging unit can take an image of the reflected light component on the reflective surface of the diaphragm plate. Therefore, the positional deviation of the reference light and the measurement light with respect to the aperture of the diaphragm plate can be observed through the imaging unit.

Therefore, in the interferometer described in Patent Document 2, the optical axis adjustment and the observation of the interference fringes can be performed on the basis of the image captured by the imaging unit without replacing the converging optical system, and therefore, the device configuration can be simplified.

Patent Document 3 discloses an image processing apparatus and an interference measurement system capable of simplifying the apparatus configuration for image display of an interferometer and of improving the workability of interference fringe measurement.

Patent Document 3 describes an image processing apparatus including: an alignment camera for capturing an image for alignment; an interference fringe camera for capturing an interference fringe image; a connection terminal unit for connecting the alignment camera and the interference fringe camera, and for transmitting image data transmitted from them; a camera changeover switch for selecting either an image for alignment or an interference fringe image from among the transmitted image data; a display unit for displaying an image based on the selected image data; an image processing unit for analyzing the image data of the interference fringe image; and a device control unit for displaying an analysis result analyzed by the image processing unit on a display unit together with the interference fringe image when the image data of the interference fringe image is selected by the camera changeover switch.

Patent Document 4 discloses a means for performing two-dimensional Fourier spectroscopy by arranging a two-dimensional detector in a detection unit.

RELATED ART DOCUMENTS

Patent Documents

Patent Document 1: JP H03-97608 U (page 20, FIGS. 1 and 2)
Patent Document 2: JP 2009-198205 A (FIG. 1)
Patent Document 3: JP 2011-215084 A (FIG. 1)
Patent Document 4: JP 5078004 B Non-Patent Documents Non-Patent Document 1: "Biomedical Photonics-Basics and Applications of Biomedical Optics," edited by the Special Committee on Next-Generation Medical Laser Application Technology, Japan Electrical Society, Ohm Corporation, Apr. 30, 2009, pp. 126-129

SUMMARY

Problem to be Solved by the Invention

In the optical measuring apparatuses described in Patent Documents 1 to 4 and Non-Patent Document 1, there is a problem in which it is difficult to obtain an accurate spectrum when the relative positional relationship between the object to be measured and the detector changes, for example, when the object to be measured moves like a living body, or when the detector (photographing unit) moves with respect to the object to be measured due to wind, vibration or the like.

As an optical measuring apparatus capable of measuring the spectrum of a moving object, for example, a hyper-spectral camera capable of obtaining two-dimensional spectrum information is known. However, even if a hyper-spectral camera is used, it is difficult to obtain an accurate spectrum when the positional relationship between the object to be measured and the detector dynamically changes.

For example, in a hyper-spectral camera with line-based, since it is necessary to provide a mechanism for scanning to the outside and to move the entire camera system to take a picture, can be easily affected by wind, vibration or the like, and it is difficult to obtain a clear photographed image.

On the other hand, in a hyper-spectral camera with filter-based, there are problems in which a time difference occurs in the measurement for each wavelength region, the wavelength resolution is uneven, the photographing speed is slow, and the like.

Further, in a hyper-spectral camera with Fourier spectroscopy-based, when the object to be measured or the detector is not stationary, it is difficult to obtain an accurate interferogram, and an inaccurate spectrum is calculated depending on the position of the object to be measured.

It is an object of the present invention to provide an optical measuring apparatus and an optical measuring method that can obtain an accurate spectrum of an object to be measured even when the positional relationship between the object to be measured and the detector changes.

Means for Solving the Problem

In order to achieve the above object, the optical measuring apparatus of an exemplary aspect of the present invention includes:

a light source that irradiates an object to be measured with light;

a splitting part that splits the light from the light source to the transmitted light transmitted through the object to be measured or the light from the light source to the reflected light reflected by the object to be measured;

a phase changing part that changes a phase of a first light which is one of the lights split by the splitting part, and that outputs the first light after which the phase is changed;

a phase fixing part that maintains a phase of a second light which is the other light split by the splitting part, and that outputs the second light;

a multiplexer that multiplexes and causes interference between the first light output from the phase changing part and the second light output from the phase fixing part, and that outputs the multiplexed light;

a detector that detects the light output from the multiplexer; and a controller that controls a change in the phase of the first light in the phase changing part and that stores a plurality of interference images composed of interference light detected by the detector for each phase difference between the second light and the first light, wherein the controller extracts a reference point that is a reference of a position of the object to be measured in the interference image from the interference image, when a displacement of the reference point from a plurality of the interference images is detected, corrects a luminance value for each pixel of the interference images in accordance with a displacement of the object to be measured indicated by a displacement of the reference point, constructs an interferogram for each pixel indicating a luminance value for each pixel for a phase difference between the second light and the first light based on the luminance value for each pixel of the interference images after the correction, and obtains information of a spectrum for each pixel from the interferogram.

On the other hand, the optical measuring method of an exemplary aspect of the present invention in an optical measuring apparatus includes:

a light source that irradiates an object to be measured with light;

a splitting part that splits the light from the light source to the transmitted light transmitted through the object to be measured or the light from the light source to the reflected light reflected by the object to be measured;

a phase changing part that changes a phase of a first light which is one of the lights split by the splitting part, and that outputs the first light after which the phase is changed;

a phase fixing part that maintains a phase of a second light which is the other light split by the splitting part, and that outputs the second light;

a multiplexer that multiplexes and causes interference between the first light output from the phase changing part and the second light output from the phase fixing part, and that outputs the multiplexed light;

a detector that detects the light output from the multiplexer; and a controller that controls a change in the phase of the first light in the phase changing part and that stores a plurality of interference images composed of interference light detected by the detector for each phase difference between the second light and the first light, the method includes steps of:

extracting, by the controller, a reference point that is a reference of a position of the object to be measured in the interference image from the interference image;

when a displacement of the reference point from a plurality of the interference images is detected, correcting, by the controller, a luminance value for each pixel of the interference images in accordance with a displacement of the object to be measured indicated by a displacement of the reference point;

constructing, by the controller, an interferogram for each pixel indicating a luminance value for each pixel for a phase difference between the second light and the first light based on the luminance value for each pixel of the interference images after the correction; and obtaining, by the controller, information of a spectrum for each pixel from the interferogram.

Effect of the Invention

According to the present invention, in the Fourier spectroscopy method, even when the positional relationship between the object to be measured and the detector changes, it is possible to obtain an accurate spectrum of the object to be measured.

EXEMPLARY EMBODIMENT

The present invention is next described with reference to the accompanying drawings.

First Exemplary Embodiment

Figure 1:
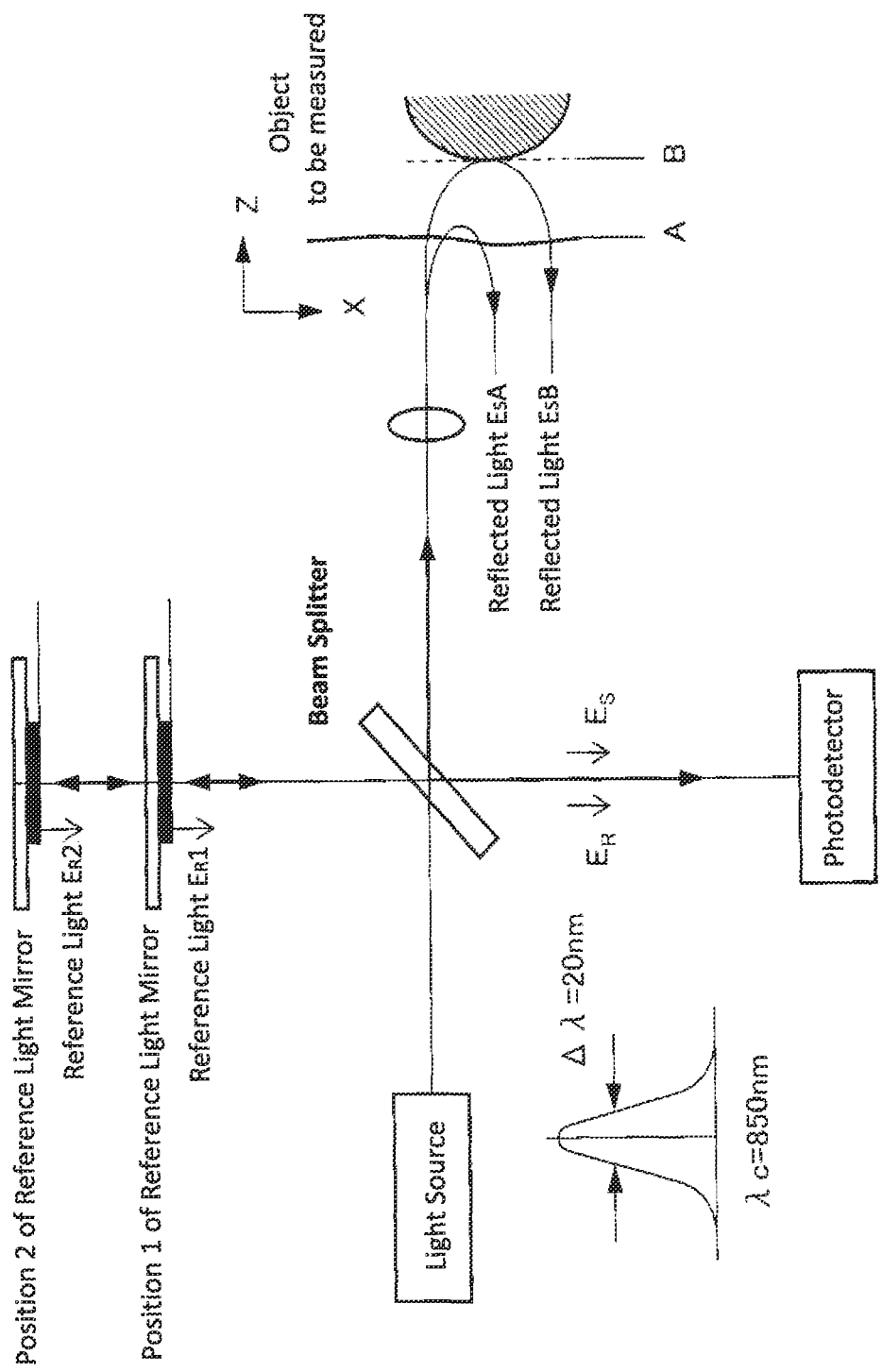
FIG. 1 is a schematic diagram showing an example of a configuration of optical coherence tomography.
Figure 2:
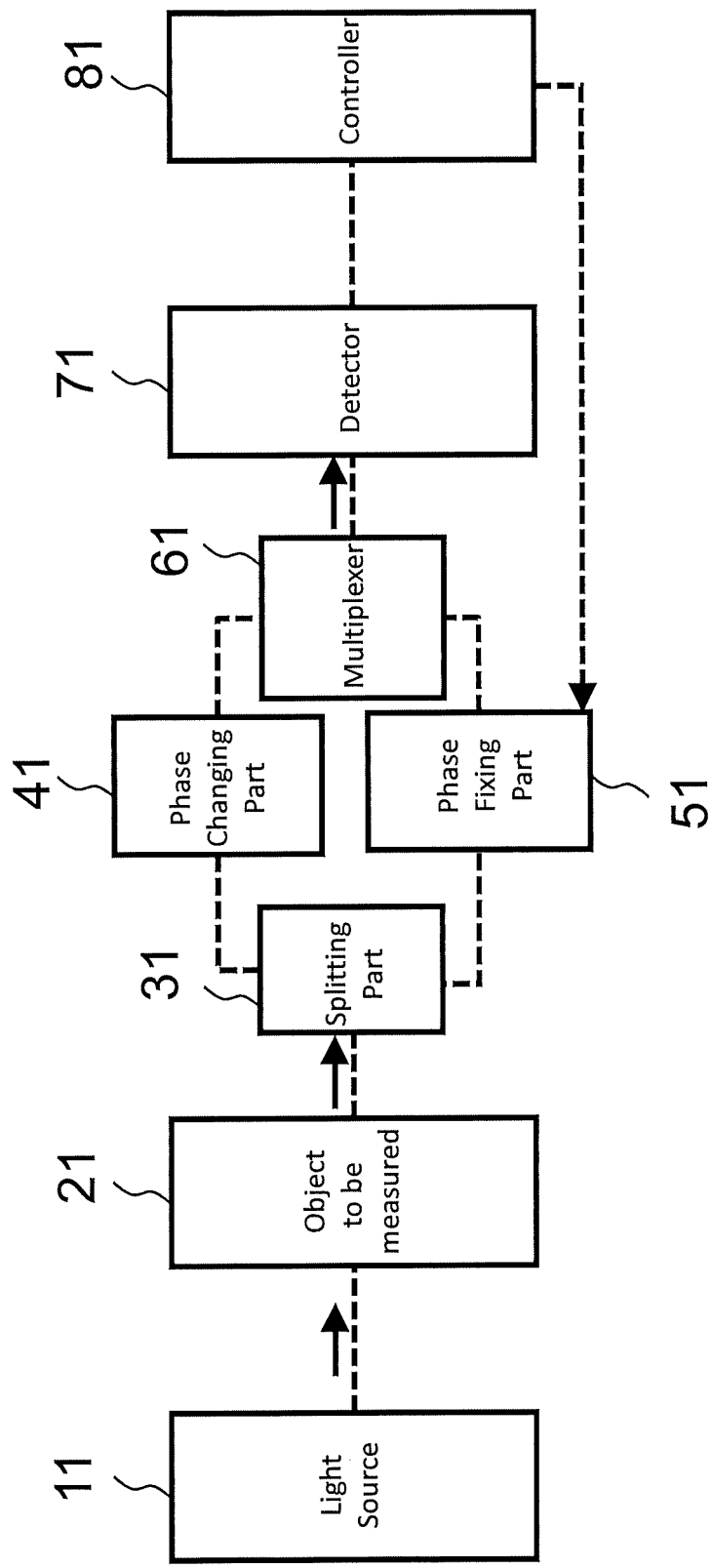
FIG. 2 is a block diagram showing an example of a configuration of the optical measuring apparatus according to the first exemplary embodiment.

FIG. 2 is a block diagram showing a configuration example of the optical measuring apparatus according to the first exemplary embodiment.

As shown in FIG. 2, the optical measuring apparatus according to the first exemplary embodiment includes: light source 11 that irradiates object to be measured 21 with light; splitting part 31 that splits the transmitted light or the reflected light of object to be measured 21; phase changing part 41 that gives a phase change to one light split by splitting part 31; phase fixing part 51 that maintains the phase of the other light split by splitting part 31; multiplexer 61 that multiplexes the light output from the phase changing part 41 and the light output from phase fixing part 51; detector 71 that detects the interference image of the light multiplexed by multiplexer 61; and controller 81 that records the interference image detected by detector 71 and that performs signal processing on the interference image. The arrow in FIG. 2 indicates the traveling direction of the light output from light source 11. The optical measuring apparatus shown in FIG. 2 is a kind of Michelson interferometer, and is used for gravity wave detection, optical velocity measurement, measurement of a reference length, shape measurement, and the like.

A light-emitting element that outputs near-infrared light of about 0.78 µm to 2.5 µm is used as light source 11, for example. As light source 11, a light-emitting element which outputs ultraviolet light (about 0.01 µm to 0.38 µm), visible light (about 0.38 µm to 0.78 µm), mid-infrared light (about 2.5 µm to 25 m) or far infrared light (about 25 µm to 100 µm) may be used. A laser oscillator for outputting a laser beam may be used as light source 11.

Object to be measured 21 is, for example, a liquid, a living body, or the like. Object to be measured 21 may be any object that transmits or reflects light, and is not limited to a liquid or a living body.

Splitting part 31 splits the light transmitted through object to be measured 21 or the light reflected by object to be measured 21 into two. Usually, a beam splitter is used for splitting part 31. In the case where a beam splitter is used as splitting part 31, the two-split beams travel different optical paths, one beam enters phase changing part 41 which gives a phase change, and the other beam enters phase fixing part 51 which does not give a phase change.

Phase changing part 41 is configured to include, for example, two mirrors (groups of mirrors) that are disposed opposite to each other on the moving stage and are inclined by 45 degrees with respect to the optical axis, and reflects one of the lights that enter from splitting part 31 in the incident direction by the mirror groups. The moving stage is for changing the position of the mirror group on the optical axis, and generates light having a phase difference with respect to the light output from phase fixing part 51 by changing the length of the optical path. It is also possible to use a well-known corner cube mirror or corner cube prism as the mirror group.

In addition to the moving stage, phase changing part 41 includes an adjusting mechanism for adjusting the angle and direction of reflected light. The adjusting mechanism is for adjusting the optical axis of one of the lights that is split by splitting part 31 and that enters phase changing part 41, and can create an arbitrary optical axis by using two mirrors. The adjusting mechanism for adjusting the angle and the traveling direction of the reflected light may be provided in each of phase changing part 41 and phase fixing part 51, or may be provided in only one of them. However, the adjusting mechanism needs to be able to electrically control the angles and positions of the two mirrors, respectively.

Phase fixing part 51 has the same configuration as that of phase changing part 41, and basically has an optical path of a fixed length.

Multiplexer 61 performs interference by multiplexing the light output from phase changing part 41 and the light output from phase fixing part 51. In the case of the above-described configuration in which phase changing part 41 and phase fixing part 51 reflect light in the incident direction, since the light output from phase changing part 41 and phase fixing part 51 returns to splitting part 31, splitting part 31 and multiplexer 61 are realized by using the same optical component.

The interference light output from multiplexer 61 is detected (photographed) by detector 71.

The two-dimensional interference image captured by detector 71 is processed by controller 81, and is then displayed on a display (not shown) or the like. Detector 71 is not limited to an imaging device or the like for capturing an interference image, and, for example, a light intensity detector or the like for detecting the distribution of the intensity of light may be used.

Figure 3:
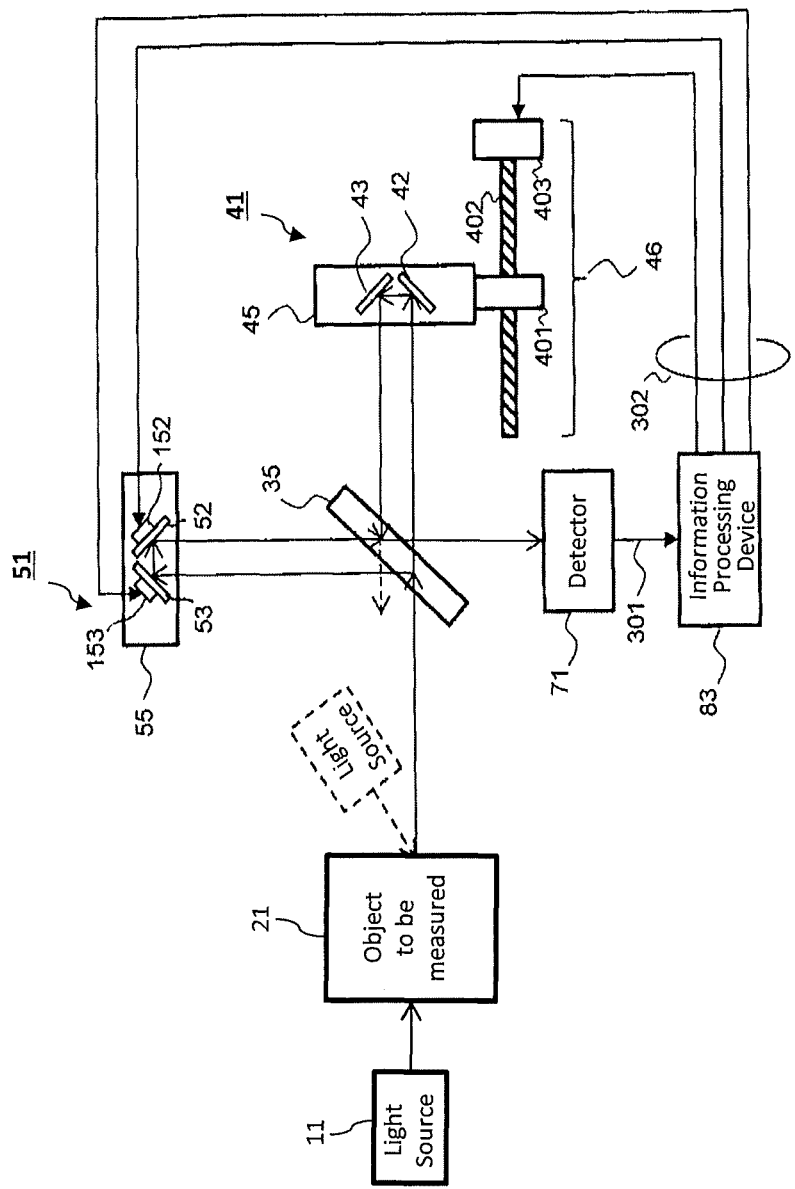
FIG. 3 is a schematic diagram showing an example of the optical measuring apparatus shown in FIG. 2.

FIG. 3 is a schematic diagram showing an example of the optical measuring apparatus shown in FIG. 2.

In the optical measuring apparatus shown in FIG. 3, beam splitter 35 is disposed in the traveling direction of the transmitted light or the reflected light of object to be measured 21. Beam splitter 35 splits the transmitted light or the reflected light of object to be measured 21 into two. One of the lights split by beam splitter 35 is guided to phase changing part 41 which gives a phase change, and the other light is guided to phase fixing part 51 which does not give a phase change.

Phase changing part 41 has a configuration in which mirrors 42 and 43, which are disposed inclined at 45 degrees with respect to the optical axis of one of the beams split by beam splitter 35, are provided on moving stage 45. Phase fixing part 51 has a configuration in which mirrors 52 and 53, which are disposed inclined at 45 degrees with respect to the optical axis of the other optical beam split by beam splitter 35, are provided on stage 55.

In the optical measuring apparatus shown in FIG. 3, phase fixing part 51 is provided with angle adjusting units 152 and 153 for changing the orientation of mirrors 52 and 53 with respect to the optical axis. Angle adjustment units 152 and 153 are adjusting mechanisms for adjusting the traveling direction of light. The adjusting mechanism is for adjusting the optical axis of the other light split by beam splitter 35, and can produce an optical axis in an arbitrary direction by adjusting the directions of mirrors 52 and 53.

Angle adjusting units 152 and 153 include, for example, stepping motors (not shown) for rotating mirrors 52 and 53 along the central axis thereof. It is preferable that one of the rotation axes of mirrors 52 and 53 be in the horizontal direction and that the other be in the vertical direction. The stepping motors (not shown) included in angle adjusting units 152 and 153 are connected to information processing device 83 via signal line 302. Angle adjusting units 152 and 153 adjust the angles of mirrors 52 and 53 by driving stepping motors (not shown) in accordance with a control signal received from information processing device 83. By adjusting the angle, the traveling direction of the light reflected by mirror 53 is adjusted.

Moving mechanism 46 is provided on moving stage 45 that is included in phase changing part 41. Moving mechanism 46 includes, for example, moving guide 401 that holds moving stage 45, screw shaft 402 that passes through moving guide 401, and stepping motor 403 that rotates screw shaft 402.

Stepping motor 403 of moving mechanism 46 rotates in accordance with a control signal received from information processing device 83, thereby moving guide 401 is moved in the horizontal direction. Thus, when the light passing through phase changing part 41 and the light passing through phase fixing part 51 are combined by multiplexer 61, i.e., beam splitter 35, the phases of the two lights can be made different from each other.

Phase changing part 41 reflects one of the lights split by beam splitter 35 in the direction of beam splitter 35 by a mirror group that includes mirrors 42 and 43. When moving stage 45 is moved by moving mechanism 46, the position of the mirror group changes with respect to the optical axis direction. When the position of the mirror group changes, the length of the optical path in phase changing part 41 changes, and therefore, a phase difference occurs between the light from phase changing part 41 and the light from phase fixing part 51.

The light from phase changing part 41 and the light from phase fixing part 51 are combined by beam splitter 35 to output interference light. As in the optical measuring apparatus shown in FIG. 3, in the configuration in which the light from object to be measured 21 is split into two by beam splitter 35 and the split light is reflected by beam splitter 35, since the split light returns to beam splitter 35, splitting part 31 and multiplexer 61 shown in FIG. 2 are realized by beam splitter 35.

Detector 71 includes an imaging device (not shown) for taking an image (interference image) composed of, for example, interference light. The interference light multiplexed by multiplexer 61 is detected (photographed) as an interference image by detector 71. As shown in FIG. 3, detector 71 is connected to information processing device 83 including controller 81 shown in FIG. 2 via signal line 301. The information of the luminance value of the two-dimensional interference image photographed by detector 71 is transmitted to information processing device 83 via signal line 301.

Figure 4:
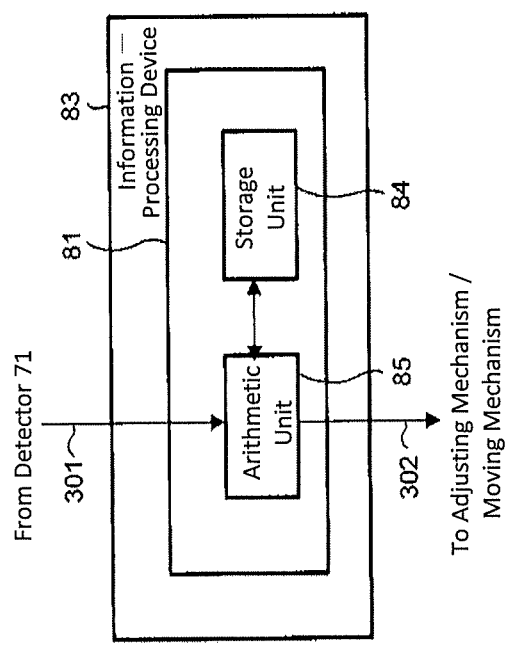
FIG. 4 is a block diagram showing an example of the configuration of the information processing device shown in FIG. 3.

FIG. 4 is a block diagram showing an example of the configuration of the information processing device shown in FIG. 3.

Information processing device 83 can be realized by, for example, a personal computer. As shown in FIG. 4, information processing device 83 includes controller 81 including storage unit 84 and arithmetic unit 85. Storage unit 84 is a semiconductor memory, for example, flash memory, RAM (Random Access Memory), ROM (Read Only Memory), or the like. Arithmetic unit 85 is, for example, a Central Processing Unit. Storage unit 84 stores a program for realizing the optical axis adjustment method and the optical measuring method shown in the present exemplary embodiment by the processing of arithmetic unit 85, and stores various information used in the arithmetic processing and the signal processing, and the like. Storage unit 84 also stores information such as the luminance value of the interference image detected by detector 71. Arithmetic unit 85 executes processing in accordance with a program stored in storage unit 84, thereby realizing an optical axis adjustment method and an optical measuring method, which will be described later. Details of the processing by controller 81 will be described later. Although not shown in FIG. 4, information processing device 83 may include a display unit for displaying the interference image so that the operator can observe the interference image, and an input unit for the operator to input instructions, information, and the like.

Although the optical measuring apparatus shown in FIG. 3 shows an example of a configuration in which light output from light source 11 is measured by using transmitted light transmitted through object to be measured 21, the optical measuring apparatus may be configured to measure light using reflected light from object to be measured 21 by providing light source 11 at a position indicated by the broken line in FIG. 3.

Further, in the optical measuring apparatus shown in FIG. 3, an example of a configuration is shown in which phase fixing part 51 is provided with an adjusting mechanism for adjusting the angle and the traveling direction (optical axis) of the reflected light, but as described above, the optical axis adjusting mechanism may be provided in phase changing part 41, or may be provided in both phase fixing part 51 and phase changing part 41. When the optical axis adjusting mechanism is provided in phase fixing part 51, phase fixing part 51 does not change the phase, so that the optical axis adjusting process can be prevented from becoming complicated. The adjusting mechanism and moving mechanism 46 are not limited to the configuration shown in FIG. 3, and any configuration may be adopted as long as the optical axis and the position of moving stage 45 can be adjusted.

Further, in the optical measuring apparatus shown in FIG. 3, an example of a configuration is shown in which phase changing part 41 includes a mirror group composed of two mirrors 42 and 43, but as described above, phase changing part 41 may include a corner cube mirror or a corner cube prism instead of the mirror group.

Figure 5:
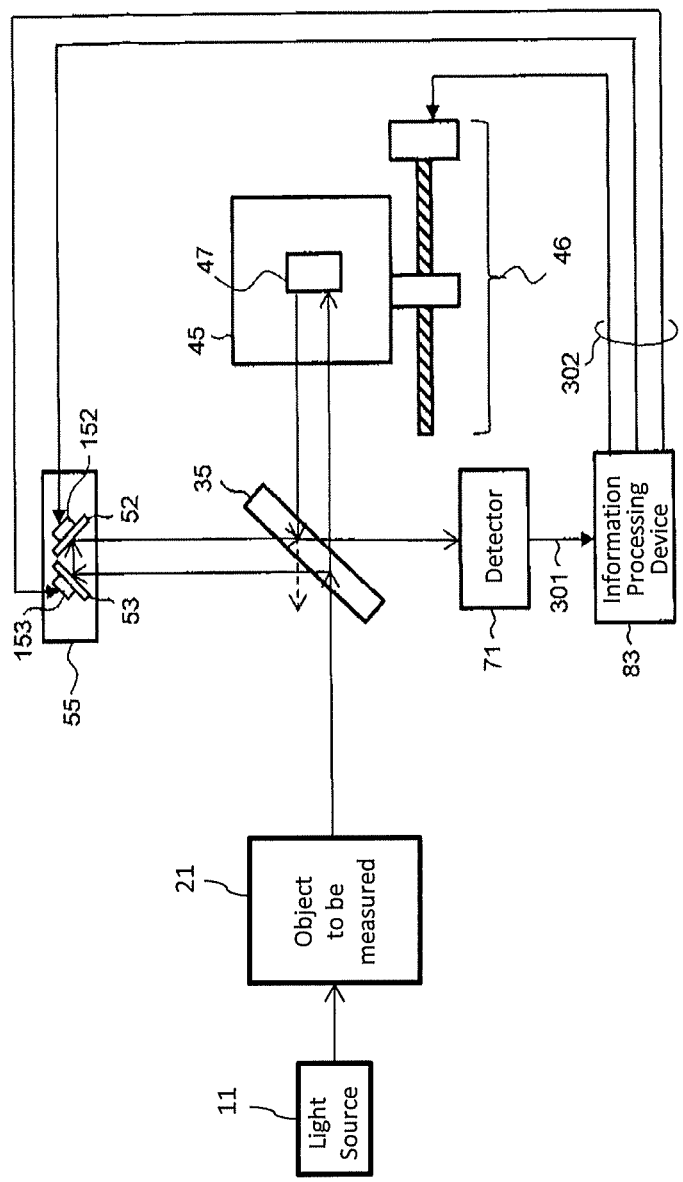
FIG. 5 is a schematic diagram showing another example of the configuration of the optical system of the optical measuring apparatus according to the first exemplary embodiment.

FIG. 5 is a schematic diagram showing another example of the configuration of the optical system of the optical measuring apparatus according to the first exemplary embodiment. The optical measuring apparatus shown in FIG. 5 has a configuration in which a corner cube mirror 47 arranged on moving stage 45 is provided in place of mirrors 42 and 43 shown in FIG. 3 in phase changing part 41. By using corner cube mirror 47 or the corner cube prism, it is possible to surely return the light from splitting part 31 (beam splitter 35) to splitting part 31.

Furthermore, in the optical measuring apparatus of the first exemplary embodiment, an example of configuration of splitting the amount of light into two from object to be measured 21 using beam splitter 35 as splitting part 31 is shown. It is not necessary, in some applications, for the optical measuring apparatus to be configured to split the amount of light into two.

In such a configuration, first, an optical axis adjusting method of the optical measuring apparatus will be described with reference to the drawings.

Figure 6:
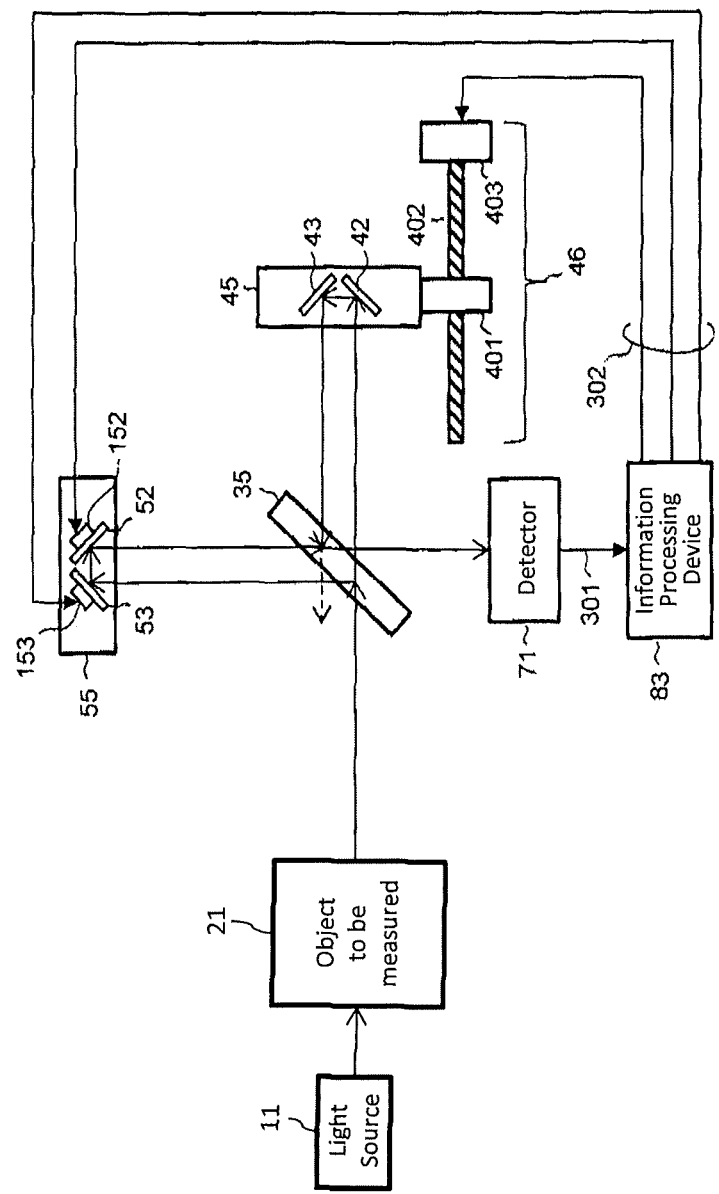
FIG. 6 is a schematic diagram showing an example configuration of an optical measuring apparatus that is an optical axis adjustment target.
Figure 7:
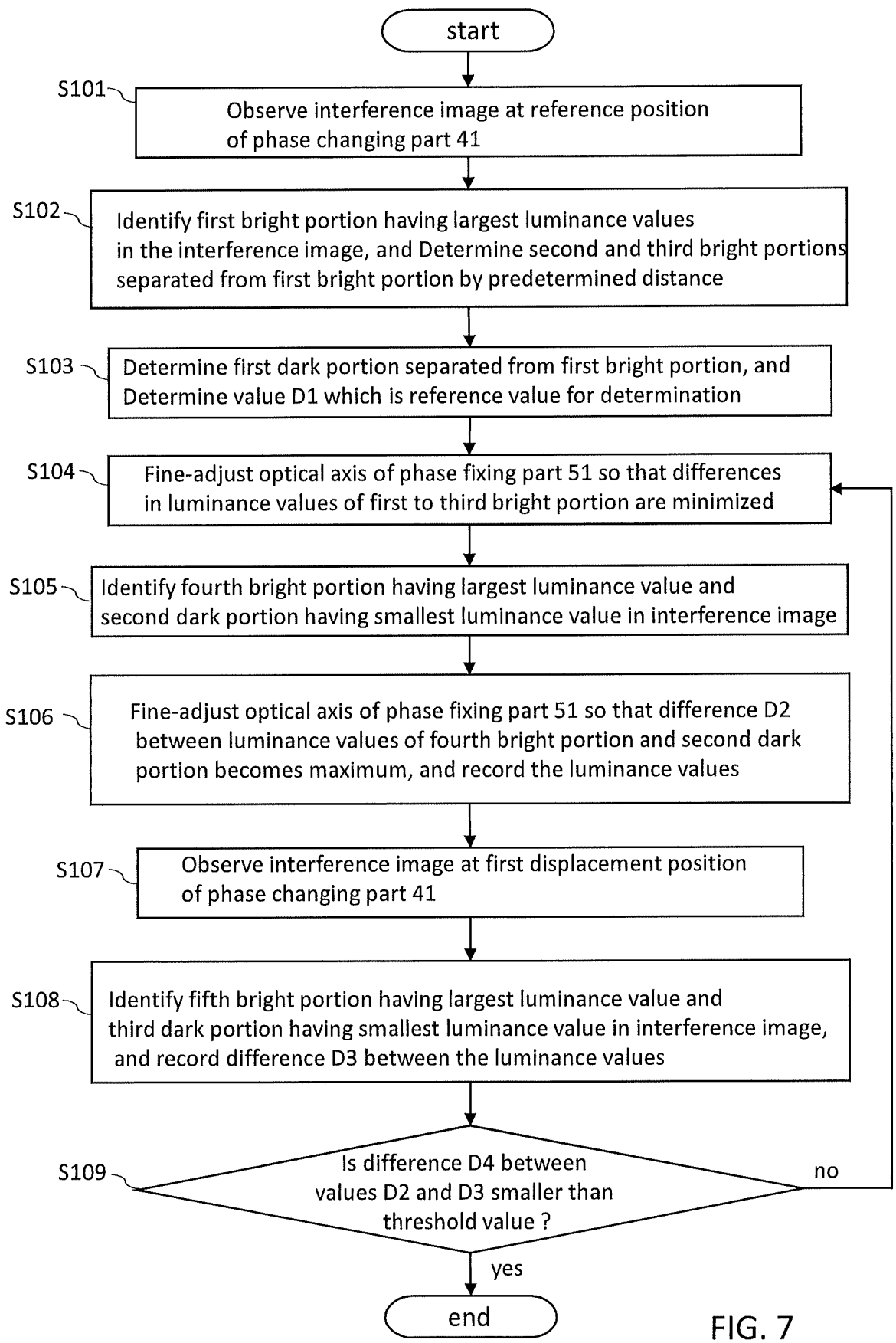
FIG. 7 is a flowchart showing an example of a processing procedure of the optical axis adjustment method in the optical measuring apparatus shown in FIG. 6.
Figure 8:
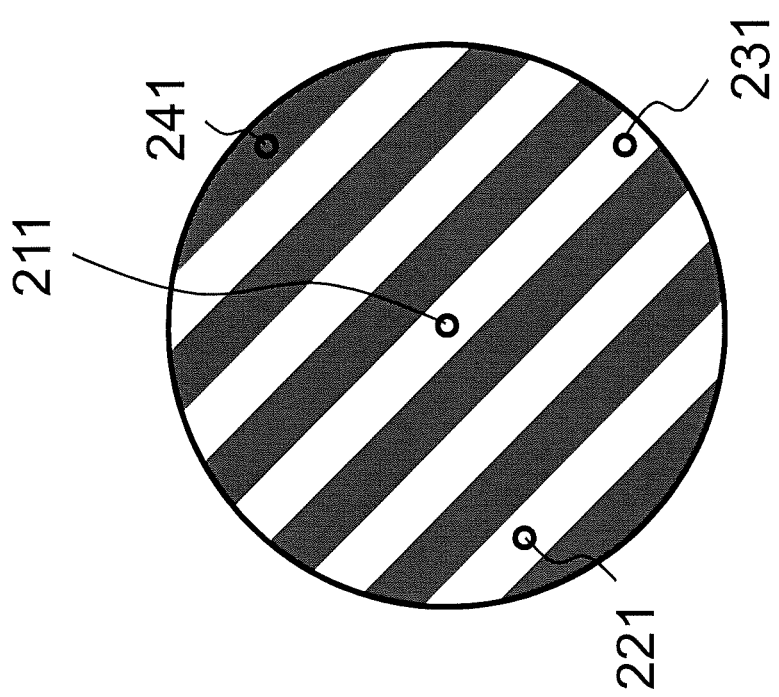
FIG. 8 is a schematic diagram showing an example of an interference image at the time of optical axis adjustment shown in FIG. 7.
Figure 9:
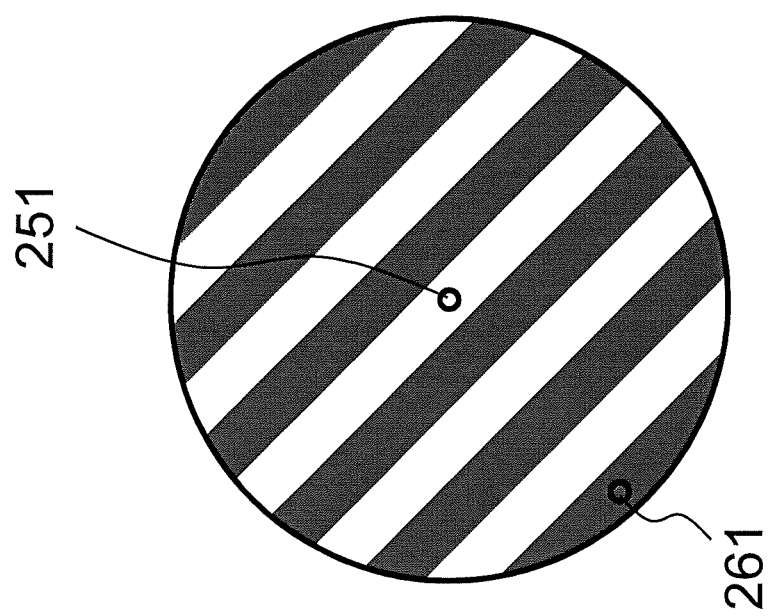
FIG. 9 is a schematic diagram showing an example of an interference image at the time of optical axis adjustment shown in FIG. 7.
Figure 10:
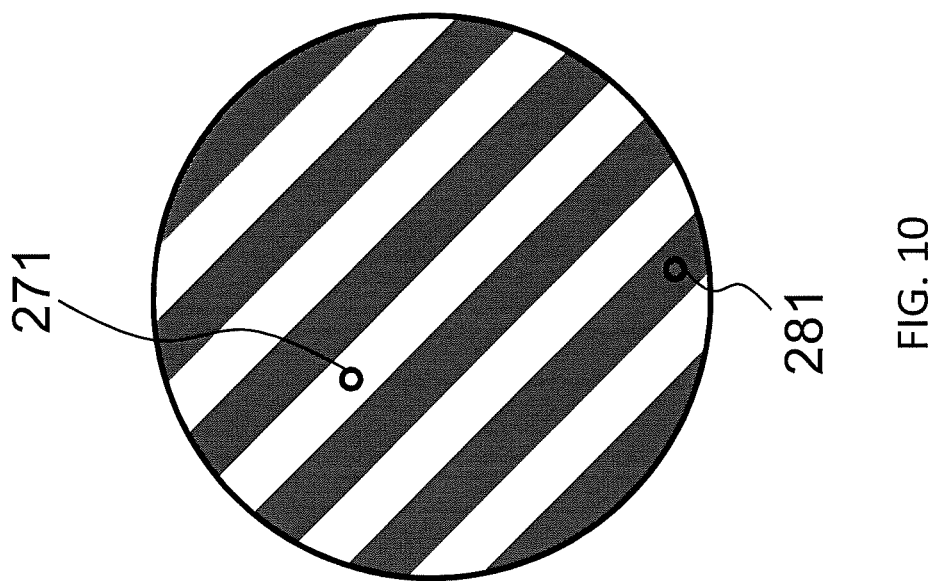
FIG. 10 is a schematic diagram showing an example of an interference image at the time of optical axis adjustment shown in FIG. 7.

FIG. 6 is a schematic diagram showing an example of a configuration of an optical measuring apparatus that is an optical axis adjustment target. FIG. 7 is a flowchart showing an example of a processing procedure of the optical axis adjustment method in the optical measuring apparatus shown in FIG. 6. FIGS. 8 to 10 are schematic diagrams showing an example of an interference image at the time of optical axis adjustment shown in FIG. 7.

The optical axis adjustment method described below is a method for controlling the adjusting mechanism to adjust the angle and the traveling direction of the reflected light described above based on the luminance value of the interference image detected by detector 71, and to adjust the traveling direction (optical axis) of the light in phase fixing part 51.

First, regarding moving stage 45 included in phase changing part 41, a position where the optical path of phase changing part 41 and the optical path of phase fixing part 51 are the same in length is set as an initial position.

Controller 81 makes moving stage 45 move from the initial position to a reference position at which detector 71 detects an interference image for the first time, and records luminance values of the interference image at the reference position (step S101 in FIG. 7). The interference image at this reference position is referred to as a "first interference image". Whether or not the image is an interference image may be determined by well-known image analysis. An example of this "first interference image" is shown in FIG. 8.

Next, controller 81 identifies first bright portion 211 having the largest luminance values in the first interference image shown in FIG. 8 by image analysis, and determines second bright portion 221 and third bright portion 231 which are separated from first bright portion 211 by a predetermined distance (step S102 in FIG. 7). Since second bright portion 221 and third bright portion 231 are points to be extracted for the purpose of ensuring uniformity in the plane of the interference image, for example, it is desirable that the position of second bright portion 221 and third bright portion 231 be as far as possible from first bright portion 211 in the plane of the interference image.

Next, controller 81 determines first dark portion 241 having the minimum luminance value, which is separated from first bright portion 211 by a predetermined distance, by image analysis, and records the difference (refer to this value as D1) between the luminance values of first bright portion 211 and first dark portion 241. Controller 81 determines the value D1 as a reference value for determination as described later (step S103 in FIG. 7). The farther first dark portion 241 is from first bright portion 211, the better.

Then, controller 81 adjusts the optical axis of phase fixing part 51 so that the differences in the luminance values of first bright portion 211, second bright portion 221 and third bright portion 231 are minimized (step S104 of FIG. 7). At this time, controller 81 records adjustment information including information on the rotation directions and rotation angles of mirrors 52 and 53 included in phase fixing part 51, and records changes in luminance values of first bright portion 211, second bright portion 221 and third bright portion 231 accompanying the adjustment. Based on the recorded adjustment information and the luminance value, controller 81 calculates the tendency of the change in the luminance values of first bright portion 211, second bright portion 221 and third bright portion 231 with respect to the adjustment direction of the angles of mirrors 52 and 53. Then, controller 81 adjusts the angles of mirrors 52 and 53 until the difference between the luminance values of first bright portion 211 and second bright portion 221 becomes equal to the difference between the luminance values of first bright portion 211 and third bright portion 231. An example of the interference image after the adjustment is shown in FIG. 9.

Next, similarly to the process of step S102, controller 81 identifies fourth bright portion 251 having the largest luminance value and second dark portion 261 having the smallest luminance value in the interference image shown in FIG. 9 by image analysis (step S105 in FIG. 7).

Then, controller 81 adjusts the traveling direction of the light by phase fixing part 51 by adjusting the angles of mirrors 52 and 53 included in phase fixing part 51 so that the difference (refer to this value as D2) between the luminance values of fourth bright portion 251 and second dark portion 261 becomes maximum. At this time, controller 81 records the adjustment information including the rotation direction and the rotation angle information of mirrors 52 and 53, and the change in the difference between the luminance values of fourth bright portion 251 and second dark portion 261. Based on the recorded adjustment information and the information on the difference between the luminance values, controller 81 obtains the tendency of the change in the difference between the luminance values of fourth bright portion 251 and second dark portion 261 with respect to the adjustment directions of the angles of mirrors 52 and 53 by calculation, and adjusts the angles of mirrors 52 and 53 until the difference is maximized (step S106 in FIG. 7).

Thereafter, controller 81 moves moving stage 45 until the light and dark fringes of the interference image are inverted at least once. The position of moving stage 45 when the light and dark fringes of the interference image are reversed at least once or more is defined as the first displacement position. At this first position, controller 81 observes the interference image detected by detector 71 and records the luminance values of the interference image (step S107 of FIG. 7). The interference image at the first displacement position is referred to as a "second interference image". An example of this second interference image is shown in FIG. 10.

Next, in the second interferometric image shown in FIG. 10, controller 81 identifies fifth bright portion 271 having the largest luminance value and third dark portion 281 having the smallest luminance value by image analysis, and records the difference (refer to this value as D3) between the luminance values of fifth bright portion 271 and third dark portion 281 (step S108 in FIG. 7).

Then, controller 81 determines whether or not the difference (refer to this value as D4) between: the difference D2 between the luminance values of fourth bright portion 251 and second dark portion 261; and the difference D3 between the luminance values of fifth bright portion 271 and third dark portion 281, is equal to or larger than a predetermined threshold value (step S109 in FIG. 7). The threshold value is set to a value smaller than at least the above-mentioned D1 that has been determined previously as the reference value of the determination.

If the value D4 is smaller than the threshold value set, controller 81 ends the adjustment of the optical axis. If the value D4 is equal to or greater than the threshold value, controller 81 repeats the optical axis adjustment returns to the process of the step S104.

Although it is desirable to perform the optical axis adjustment according to the processing procedure shown in FIG. 7, it is also possible to perform the adjustment based on the luminance values of first bright portion 211, second bright portion 221 and third bright portion 231 in the first interference image, and based on the luminance values of fifth bright portion 271 in the second interference image. For example, it is possible to predict the deviation of the angles of mirrors 52 and 53 from the difference in the luminance values of first bright portion 211, second bright portion 221 and third bright portion 231, and it is possible to predict the deviation of the moving direction of moving stage 45 from the difference in the luminance value of the bright portion in the first interference image and the luminance value of the bright portion in the second interference image. Therefore, the angles of mirrors 52 and 53 and the position of moving stage 45 may be determined from these predicted values.

In addition, even if the optical axis is only adjusted so that the differences in the luminance values of first bright portion 211, second bright portion 221 and third bright portion 231 shown in the step S104 of FIG. 7 are minimized, it is possible to obtain a certain effect with respect to the optical axis adjustment.

Next, an optical measuring method according to the first exemplary embodiment will be described with reference to the drawings.

In the first exemplary embodiment, after the optical axis adjustment of the optical measuring apparatus is performed according to the processing procedure shown in FIG. 7, moving stage 45 is moved to continuously change the phase of the light passing through phase changing part 41 with respect to the light passing through phase fixing part 51, thereby performing the spectrum measurement by using Fourier transform infrared spectroscopy.

Specifically, controller 81 moves moving stage 45, and continuously records the image data (luminance value for each pixel) of the interference image captured by detector 71 in association with the amount of movement (amount of phase change of light in phase changing part 41) of moving stage 45. The meaning of "continuously record" is that moving stage 45 is sequentially stopped at a plurality of discrete positions determined in advance, and data including the amount of movement of moving stage 45 and the luminance value of each pixel is stored in storage unit 84 for each stop position. The graph showing the luminance value of each pixel of the interference image with respect to the amount of phase change of light (optical path difference between phase changing part 41 and phase fixing part 51) is generally called an "interferogram".

Controller 81 constructs an interferogram for each pixel on the basis of the luminance values for each pixel of the plurality of interference images stored in storage unit 84, and obtains the information of the spectrum for each pixel by Fourier transforming the interferogram. As a result, it is possible to obtain the information of the in-plane spectrum from the data of the two-dimensional image (interference image) detected by detector 71.

In a period in which an interference image is photographed for each stop position of moving stage 45 and image data of a plurality of interference images is stored (hereinafter referred to as a spectrum measurement period), when object to be measured 21 or detector 71 or both are moved, the relative position between object to be measured 21 and detector 71 changes, and therefore, a correct interferogram cannot be generated.

Figure 11:
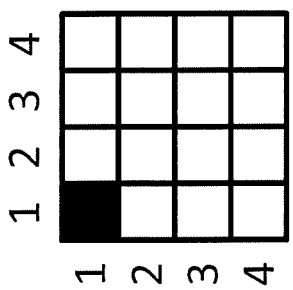
FIG. 11 is a schematic diagram showing an example of movement of an object to be measured in the optical measuring method according to the first exemplary embodiment.
Figure 11:
Figure 11:
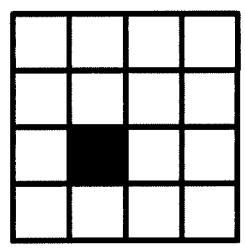
Figure 11:
Figure 11:
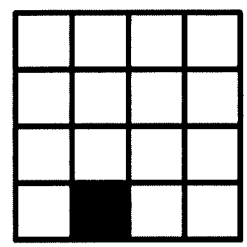

FIG. 11 is a schematic diagram showing an example of movement of an object to be measured in the optical measuring method according to the first exemplary embodiment.

FIG. 11 is a diagram showing the position of an image showing an object to be measured in coordinates in the interference image photographed by detector 71. It is assumed that the image of each coordinate is represented by the luminance values of a plurality of pixels.

For example, as shown by (a) to (c) in FIG. 11, when an image of coordinates (1, 1), shown in black, moves in the order of coordinates (2, 2) and coordinates (1, 2) with the passage of time, a correct interferogram cannot be generated from a series of luminance values for each pixel at coordinates (1, 1) obtained in the spectrum measurement period, and therefore, accurate in-plane spectrum information cannot be obtained.

Therefore, in the present invention, controller 81 extracts a reference point that is the reference position from the image data of the interference image obtained in the spectrum measurement period. As the reference point, for example, a feature point of object to be measured 21 extracted from the image data of the interference image is used. Controller 81, in a plurality of interference images stored in storage unit 84, when detecting the displacement of the feature point (reference point), corrects the luminance value for each pixel of the plurality of interference images to follow the displacement of object to be measured 21 indicated by the displacement of the reference point.

As a method of correcting the luminance value, for example, there is the following method.

When the displacement of the feature point (reference point) is detected, controller 81 first calculates the displacement direction and the amount of displacement for each interference image, and specifies the position after the displacement of object to be measured 21 in each interference image. Then, controller 81 stores the luminance value for each pixel indicating object to be measured 21 after displacement in each interference image in association with the position before displacement of object to be measured 21 in storage unit 84, and corrects each luminance value by replacing the luminance value for each pixel indicating object to be measured 21 after displacement in each interference image with the position before displacement of object to be measured 21.

When the luminance value for each pixel of each interference image is corrected, controller 81 constructs an interferogram for each pixel based on the luminance value for each pixel of each interference image after the correction. In the first exemplary embodiment, it is assumed that the positional relationship (distance or direction) between the extracted feature point (reference point) and each pixel in the interference image does not change.

For example, as shown by (a) to (c) in FIG. 11, when the image of the coordinates (1, 1) shown by black is sequentially moved to the coordinates (2, 2) and coordinates (1, 2), in the first exemplary embodiment, the coordinates (2, 2) and coordinates (1, 2), after the displacement of the image, are sequentially specified from the displacement direction and the amount of displacement of the feature point (reference point), and the luminance values of the specified coordinates (2, 2) and coordinates (1, 2) for each pixel are stored in association with the coordinates (1, 1). Then, an interferogram is constructed on the basis of the luminance value for each pixel of the coordinates (1, 1) before the displacement and the luminance values for each pixel of the coordinates (2, 2) and the coordinates (1, 2) after the displacement. Therefore, even if object to be measured 21 or detector 71 or both are moved, a correct interferogram can be generated.

For example, when object to be measured 21 is a living body, the characteristic part such as the face (eyes, nose, mouth) or the limb may be extracted by image analysis, and the extracted characteristic part may be used as the feature point. The feature points may be extracted by using a well-known image analysis, and the present invention does not limit the extraction method for the feature point.

Figure 12:
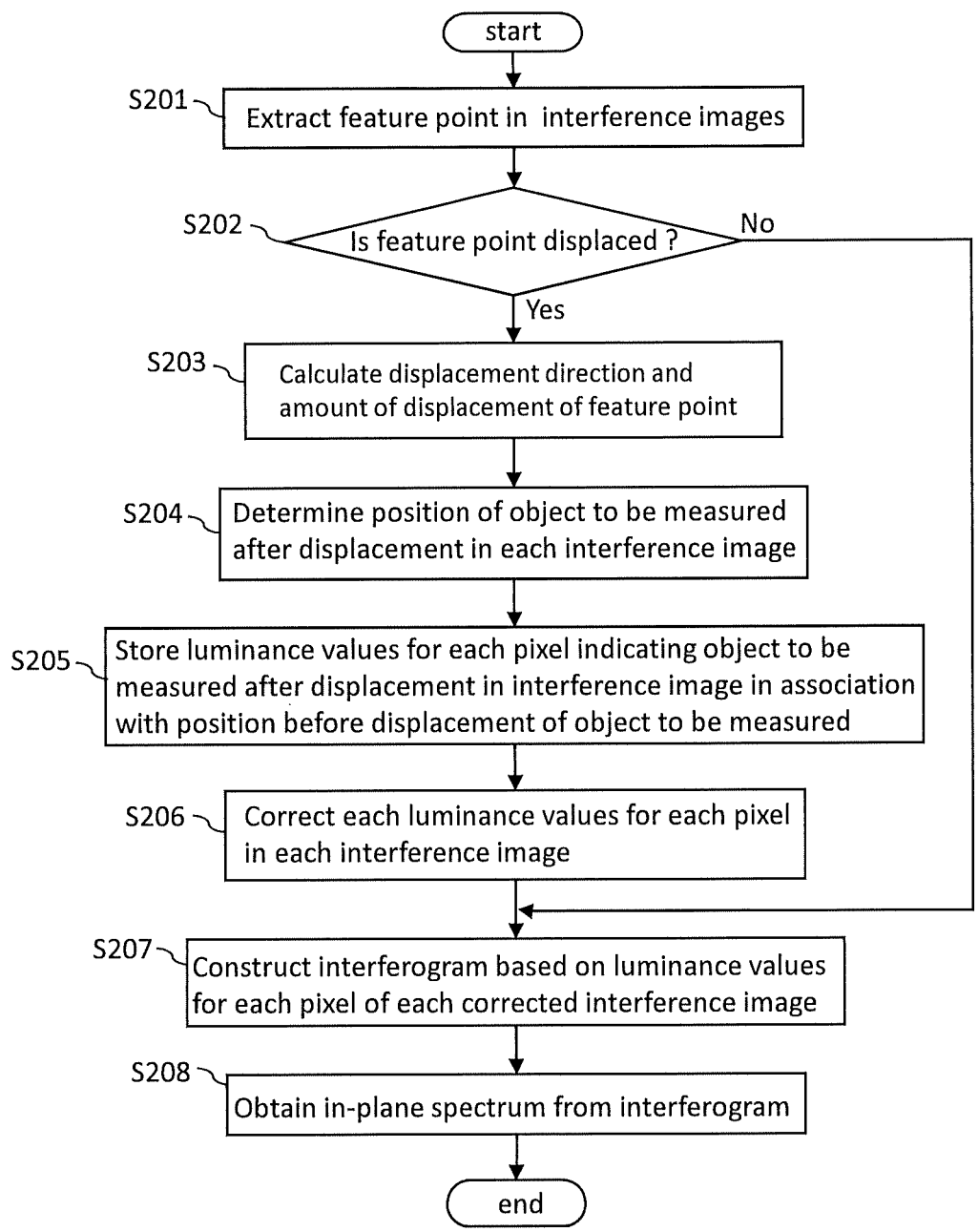
FIG. 12 is a flowchart showing an example of a processing procedure of the optical measuring method according to the first exemplary embodiment.

FIG. 12 is a flowchart showing an example of a processing procedure of the optical measuring method according to the first exemplary embodiment. The processing procedure shown in FIG. 12 is executed by controller 81 shown in FIG. 2.

It is assumed that storage unit 84 stores image data of a plurality of interference images obtained in advance in the spectrum measurement period, i.e., luminance values for each pixel. As described above, since the image data of each interference image is stored in association with the amount of movement of moving stage 45, the interference image corresponding to the phase change amount of the light can be identified. Therefore, the image data of the interference image photographed by detector 71 at each stop position need not be stored in storage unit 84 in sequence from the first stop position to the last stop position of moving stage 45.

As shown in FIG. 12, controller 81 first extracts the feature point (reference point) of object to be measured 21 in the image data of one or a plurality of arbitrarily interference images stored in storage unit 84 by using a well-known image analysis (step S201).

Next, controller 81 determines whether or not the feature point extracted in step S201 is displaced in the image data of the plurality of interference images stored in storage unit 84 (step S202). Whether or not the feature point has been displaced may be determined, for example, by detecting the coordinates of the feature point included in each interference image and by comparing the coordinates in each interference image.

When the feature point is not displaced, controller 81 proceeds to the process of step S206, and constructs an interferogram for each pixel based on the luminance values for each pixel of each interference image stored in storage unit 84.

When the feature point is displaced, controller 81 calculates the displacement direction and the amount of displacement for each interferogram (step S203).

Next, controller 81 determines the position of object to be measured 21 after the displacement of object to be measured 21 in the interference images based on the displacement directions and the amount of displacement of the feature point obtained in step S203 (step S204). Then, controller 81 stores the luminance values for each pixel indicating object to be measured 21 after the displacement in the interference image in association with the position before the displacement of object to be measured 21 in the interference image in storage unit 84 (step S205), and corrects each luminance values by replacing the luminance values for each pixel indicating object to be measured 21 after the displacement in each interference image with the position before the displacement of object to be measured 21 (step S206).

Next, controller 81 constructs an interferogram based on the luminance values for each pixel of each interference image corrected in the process of step S206 (step S207).

Finally, controller 81 performs Fourier transform on the constructed interferogram to obtain an in-plane spectrum in step S208.

According to the optical measuring method of the first exemplary embodiment, controller 81 extracts a feature point (reference point) from a plurality of interference images photographed by detector 71, and when the displacement of the feature point is detected, the luminance value of each pixel of the plurality of interference images is corrected to follow the displacement of object to be measured 21 indicated by the displacement of the reference point, and the interferogram is constructed based on the luminance value of each pixel of the plurality of interference images after the correction. Therefore, even when object to be measured 21 or detector 71 or both are moved, an accurate interferogram can be obtained. Therefore, in.

Fourier transform infrared spectroscopy (Fourier spectroscopy), even when the positional relationship between object to be measured 21 and detector 71 changes, accurate spectral information of object to be measured 21 can be obtained.

Second Exemplary Embodiment

In the second exemplary embodiment, controller 81 divides the interference image captured by detector 71 into a plurality of regions, generates an interferogram (first interferogram) of each pixel for each divided region, and obtains information of a spectrum (first spectrum) in a plane for each region from the first interferogram. Then, a pixel having a characteristic spectrum (hereinafter, referred to as a reference pixel) is extracted from the calculated spectral information, and when the displacement of the reference pixel is detected, the luminance value for each pixel of the plurality of interference images is corrected to follow the displacement of object to be measured 21 indicated by the displacement of the reference pixel, and an interferogram (second interferogram) is constructed based on the luminance value for each pixel of the plurality of interference images after the correction. That is, the optical measuring method of the second exemplary embodiment is an example in which the reference pixel is used as a reference point for tracking each pixel, instead of the feature point shown in the first exemplary embodiment.

A reference pixel having a characteristic spectrum refers to a pixel having a spectrum whose envelope differs from that of surrounding pixels, for example. The reference pixel may be extracted by, for example, comparing the calculated envelope of the first spectrum for each pixel by data analysis. The configuration of the optical measuring apparatus and the optical axis adjustment method of the optical measuring apparatus are the same as those of the first exemplary embodiment, and therefore, the description thereof is omitted.

As described above, in the second exemplary embodiment, the in-plane spectrum (first spectrum) is calculated for each divided region, and the reference pixels are extracted by comparing the envelopes of the first spectra of the pixels in the region. In this case, controller 81 does not need to extract the reference pixel in all the divided regions, and if the reference pixel can be extracted in at least one region, the extraction processing of the reference pixel can be terminated at that time. Therefore, a reference pixel used for tracking each pixel in the interference image can be extracted without causing an increase in the processing load by controller 81.

Controller 81 may extract the reference pixel from the entire interference image without dividing the interference image captured by detector 71 into a plurality of regions. Whether or not the reference pixel is extracted by dividing the interference image captured by detector 71 may be determined by taking into consideration the processing capability of the CPU or the like included in controller 81.

In the optical measuring method of the second exemplary embodiment, similarly to the optical measuring method of the first exemplary embodiment, even when the positional relationship between object to be measured 21 and detector 71 varies in Fourier transform infrared spectroscopy, accurate spectral information of object to be measured 21 can be obtained.

Third Exemplary Embodiment

In the first and second exemplary embodiments, an example is described in which object to be measured 21, detector 71 or both are moved in the direction parallel to the image plane of the two-dimensional image (interference image) detected by detector 71, that is, an example in which the positional relationship (distance or direction) between the extracted reference point (feature point or reference pixel) and each pixel in the interference image does not change.

The third exemplary embodiment is a processing example in the case where the positional relationship (distance or direction) between the reference point and each pixel in the interference image changes with time.

For example, when object to be measured 21 is moving away from the detector 71, or when object to be measured 21 is approaching detector 71, the size of object to be measured 21 that has been photographed by detector 71 changes. In such a case, it is thought that the positional relationship (distance or direction) between the reference point and each pixel in the interference image changes.

Therefore, in the third exemplary embodiment, the amount of change in the direction and distance of object to be measured 21 with respect to the reference point is calculated from the rate of change in the size of object to be measured 21, and the position after the displacement of object to be measured 21 in the interference image is specified using the displacement direction and the amount of displacement, which are corrected based on the amount of change in the direction and distance. Then, the luminance value for each pixel of the plurality of interference images is corrected to follow the displacement of object to be measured 21 indicated by the displacement of the reference point, and an interferogram is constructed based on the luminance value for each pixel of the plurality of interference images after the correction. The rate of change of the size of object to be measured 21 may be obtained, for example, by extracting two or more reference points and calculating the amount of displacement of the positional relationship (distance or direction) between the reference points. The configuration of the optical measuring apparatus and the optical axis adjustment method of the optical measuring apparatus are the same as those of the first exemplary embodiment, and therefore, the description thereof is omitted.

According to the optical measuring method of the third exemplary embodiment, the same effect as the optical measuring method of the first and second exemplary embodiments can be obtained even when the positional relationship (distance or direction) of each pixel with respect to the reference point changes in the interference image detected (photographed) by detector 71.

Fourth Exemplary Embodiment

In the fourth exemplary embodiment, detector 71 is provided with an angular velocity sensor for detecting the angular velocity of detector 71, and a correction mechanism for canceling the angular velocity of detector 71 detected by the angular velocity sensor is provided. As the correcting mechanism, any well-known mechanism may be used as long as detector 71, the correction lens or the like can be moved in a direction that cancels the angular velocity of detector 71, that is, the blurring of the captured image captured by detector 71. A well-known rotation type gyro sensor, an optical type gyro sensor, a vibration type gyro sensor or the like may be used as the angular velocity sensor.

When a correction lens is provided as the correcting mechanism, the correction lens may be provided on an optical path between detector 71 and beam splitter 35 shown in FIGS. 3 and 5, for example.

Controller 81 of the fourth exemplary embodiment receives a signal indicating the angular velocity of detector 71 detected by the angular velocity sensor, and outputs a control signal for moving detector 71, the correction lens or the like so as to cancel the angular velocity to the correcting mechanism. The other configurations of the optical measuring apparatus and the method of adjusting the optical axis of the optical measuring apparatus are the same as those of the first exemplary embodiment, and therefore description thereof is omitted. As the optical measuring method, the methods described in the first to third exemplary embodiments may be performed.

According to the fourth exemplary embodiment, since the blurring of the captured image caused by the angular velocity of detector 71 can be canceled by using the correcting mechanism, a clearer interference image can be captured by detector 71. Therefore, more accurate interferogram and spectrum information can be obtained than based on the optical measuring methods described in the first to third exemplary embodiments.

Fifth Exemplary Embodiment

In the fifth exemplary embodiment, detector 71 is provided with a position sensor for measuring the displacement of detector 71, and controller 81 records the luminance value for each pixel while correcting the position of each pixel using the displacement amount of detector 71 detected by the position sensor, thereby creating an interferogram. A well-known Global Positioning System (GPS) device, an ultrasonic sensor, a magnetic sensor, an optical sensor, an acceleration sensor or the like may be used as the position sensor. The other configurations of the optical measuring apparatus and the method of adjusting the optical axis of the optical measuring apparatus are the same as those of the first exemplary embodiment, and therefore description thereof is omitted. As the optical measuring method, the methods described in the first to third exemplary embodiments may be performed.

According to the fifth exemplary embodiment, since the interferogram is constructed while correcting the position of each pixel using the displacement amount of detector 71 detected by the position sensor, it is possible to obtain more accurate interferogram and spectrum information than based on the optical measuring method described in the first to the third exemplary embodiments, as in the fourth exemplary embodiment.

Sixth Exemplary Embodiment

The sixth exemplary embodiment is an example of a method of combining the light measurement method described in the first to third exemplary embodiments and the processing described in the fourth or fifth exemplary embodiment.

In general, the intensity (luminance value) of the interferogram is maximized in a region in which the optical path difference between the two lights split by splitting part 31 is small, and the intensity (luminance value) gradually decreases as the optical path difference (the phase change amount of the light in phase changing part 41) increases to reach the baseline. The region where the optical path difference is small is, for example, an optical path difference from the reference position until the bright and dark fringes of the interference image are inverted about once, and the region where the optical path difference is large is, for example, an optical path difference in which the bright and dark fringes of the interference image are inverted twice or more from the reference position.

Therefore, in the generated interferogram, if the intensity (luminance value) in the region, where the optical path difference is large, is large, object to be measured 21 or detector 71 or both are moved with a large, and it is thought that an accurate interferogram cannot be generated by only the optical measuring methods described in the first to third exemplary embodiments.

On the other hand, if the intensity (luminance value) in the region, where the optical path difference is large, is small, object to be measured 21 or detector 71 or both are moved with a small, and it is thought that an accurate interferogram can be generated by only the optical measuring methods described in the first to third exemplary embodiments.

Therefore, in the sixth exemplary embodiment, controller 81 first generates an interferogram by using any one of the optical measuring methods described in the first to third exemplary embodiments (in the case of the second exemplary embodiment, a first interferogram). When the intensity (luminance value) of the generated interferogram in the region where the optical path difference is large is, for example, 25% or more of the maximum value, the interferogram is generated again by executing the processing described in the fourth or fifth exemplary embodiment together.

At this time, when there is an inflection point in the interferogram whose intensity fluctuates abruptly except for the maximum value, controller 81 may generate the interferogram again by removing and interpolating the inflection point.

In the case where the intensity (luminance value) in the region where the optical path difference is large is still 25% or more of the maximum value in the generated interferogram, controller 81 generates the interferogram again by changing the combination of the optical measuring method described in the first to third exemplary embodiments and the processing described in the fourth or fifth exemplary embodiment, for example. Alternatively, the interferogram is generated again by performing both the processing described in the fourth and fifth exemplary embodiments. In this case, the controller 81 may obtain the spectral information from the interferogram when the interferogram having the intensity (luminance value) in the region, where the optical path difference is large, is obtained, for example, 10% or less of the maximum value.

On the other hand, when the intensity (luminance value) of the generated interferogram in the region where the optical path difference is large is, for example, 10% or less of the maximum value, the controller 81 obtains spectral information from the interferogram by performing Fourier transform on a pixel-by-pixel basis. The other configurations of the optical measuring apparatus and the method of adjusting the optical axis of the optical measuring apparatus are the same as those of the first exemplary embodiment, and therefore description thereof is omitted.

According to the optical measuring method of the sixth exemplary embodiment, it is determined whether or not an accurate interferogram has been generated from the characteristics of the interferogram, and when it is thought that an accurate interferogram has not been generated, the processing shown in the fourth or fifth exemplary embodiment is executed together with the optical measuring method shown in the first to third exemplary embodiments. Therefore, the processing load and the processing time for optical measurement can be expected to be reduced.

Seventh Exemplary Embodiment

In the seventh exemplary embodiment, controller 81 divides the spectrum measurement period into a plurality of measurement sections, and generates an interferogram (first interferogram in the second exemplary embodiment) for each of the divided measurement sections. Then, a plurality of first spectra are calculated from the plurality of generated interferograms, and the interferograms of the entire measurement period (=spectrum measurement period) are generated again by removing and interpolating the measurement section in which the envelope of the first spectrum is largely different from the other measurement sections.

The optical measuring method of the seventh exemplary embodiment is, for example, a process assuming a case where object to be measured 21 or detector 71 is moved abruptly in an arbitrary measurement section among a plurality of measurement sections, and thus an interference image cannot be obtained.

In the seventh exemplary embodiment, the controller 81 removes the interferogram of the corresponding measurement section and generates the interferogram of the entire measurement period by interpolating the interferogram of the measurement section when there is a spectrum whose envelope is largely different from that of other measurement sections among the plurality of calculated spectra. The configuration of the optical measuring apparatus and the optical axis adjustment method of the optical measuring apparatus are the same as those of the first exemplary embodiment, and therefore, the description thereof is omitted.

According to the seventh exemplary embodiment, for example, even when there is a measurement section, in which an interference image cannot be obtained due to a large movement of object to be measured 21 or detector 71, accurate interferogram and spectrum information can be obtained.

Although the present invention has been described above with reference to the embodiments, the present invention is not limited to the above-described embodiments. Various modifications that can be understood by those skilled in the art within the scope of the present invention are possible in the configuration and details of the present invention.

The invention claimed is:

1. An optical measuring apparatus comprising:
   a light source that irradiates an object to be measured with light;
   a splitting part that splits the light from the light source to the transmitted light transmitted through the object to be measured or the light from the light source to the reflected light reflected by the object to be measured;
   a phase changing part that changes a phase of a first light which is one of the lights split by the splitting part, and that outputs the first light after which the phase is changed;
   a phase fixing part that maintains a phase of a second light which is the other light split by the splitting part, and that outputs the second light;
   a multiplexer that multiplexes and causes interference between the first light output from the phase changing part and the second light output from the phase fixing part, and that outputs the multiplexed light;
   a detector that detects the light output from the multiplexer;
   a memory storing instructions; and
   one or more processors configured to execute the instructions to:
   control a change in the phase of the first light in the phase changing part;

store a plurality of interference images composed of interference light detected by the detector for each phase difference between the second light and the first in the memory;

extract a reference point that is a reference of a position of the object to be measured in the interference image from the interference image;

when a displacement of the reference point from a plurality of the interference images is detected, correct a luminance value for each pixel of the interference images in accordance with a displacement of the object to be measured indicated by a displacement of the reference point;

construct an interferogram for each pixel indicating a luminance value for each pixel for a phase difference between the second light and the first light based on the luminance value for each pixel of the interference images after the correction;

obtain information of a spectrum for each pixel from the interferogram; and use a pixel having an envelope spectrum different from that of surrounding pixels as the reference point among the spectra for each pixel obtained from the interferogram generated for each pixel.

2. The optical measuring apparatus according to claim 1, wherein the one or more processors are further configured to use a feature point of the object to be measured extracted from the interference image as the reference point.

3. The optical measuring apparatus according to claim 1, wherein the one or more processors are further configured to calculate an amount of change of direction and distance of each pixel with respect to the reference point from a change rate of a size of the object to be measured in the interference image, and specify a position after displacement of each pixel using the displacement direction and the amount of displacement which are corrected based on the amount of change in the direction.

4. The optical measuring apparatus according to claim 1, further comprising:
   an angular velocity sensor that detects an angular velocity of the detector; and
   a correcting mechanism that cancels the angular velocity of the detector detected by the angular velocity sensor.

5. The optical measuring apparatus according to claim 1, further comprising a position sensor that measures a displacement of the detector, wherein
   the one or more processors are further configured to correct the position of each pixel in the interference image using the amount of displacement of the detector detected by the position sensor.

6. The optical measuring apparatus according to claim 1, wherein when an inflection point is present in the interferogram, except for the maximum value of the luminance value, the one or more processors are further configured to remove the inflection point and performs interpolation to regenerate the interferogram.

7. An optical measuring apparatus comprising:
   a light source that irradiates an object to be measured with light;
   a splitting part that splits the light from the light source to the transmitted light transmitted through the object to be measured or the light from the light source to the reflected light reflected by the object to be measured;
   a phase changing part that changes a phase of a first light which is one of the lights split by the splitting part, and that outputs the first light after which the phase is changed;
   a phase fixing part that maintains a phase of a second light which is the other light split by the splitting part, and that outputs the second light;
   a multiplexer that multiplexes and causes interference between the first light output from the phase changing part and the second light output from the phase fixing part, and that outputs the multiplexed light;
   a detector that detects the light output from the multiplexer;
   a memory storing instructions; and
   one or more processors configured to execute the instructions to:
   control a change in the phase of the first light in the phase changing part;
   store a plurality of interference images composed of interference light detected by the detector for each phase difference between the second light and the first light in the memory;
   extract a reference point that is a reference of a position of the object to be measured in the interference image from the interference image;
   when a displacement of the reference point from a plurality of the interference images is detected, correct a luminance value for each pixel of the interference images in accordance with a displacement of the object to be measured indicated by a displacement of the reference point;
   construct an interferogram for each pixel indicating a luminance value for each pixel for a phase difference between the second light and the first light based on the luminance value for each pixel of the interference images after the correction;
   obtain information of a spectrum for each pixel from the interferogram;
   divide the detection period of the interference image by the detector into a plurality of detection sections;
   generate an interferogram for each of the divided detection sections;
   obtain a plurality of first spectra for each pixel from the generated interferogram for each detection section;
   remove a first spectrum in a detection section having an envelope different from other detection sections among the plurality of first spectra; and
   perform interpolation to regenerate the interferogram.

8. An optical measuring method in an optical measuring apparatus comprising:
   a light source that irradiates an object to be measured with light;
   a splitting part that splits the light from the light source to the transmitted light transmitted through the object to be measured or the light from the light source to the reflected light reflected by the object to be measured;
   a phase changing part that changes a phase of a first light which is one of the lights split by the splitting part, and that outputs the first light after which the phase is changed;
   a phase fixing part that maintains a phase of a second light which is the other light split by the splitting part, and that outputs the second light;
   a multiplexer that multiplexes and causes interference between the first light output from the phase changing part and the second light output from the phase fixing part, and that outputs the multiplexed light;
   a detector that detects the light output from the multiplexer;
   a memory storing instructions; and
   one or more processors connected to the memory, the method comprising steps of:

controlling, by the one or more processors, a change in the phase of the first light in the phase changing part;

storing, by the one or more processors, a plurality of interference images composed of interference light detected by the detector for each phase difference between the second light and the first light in the memory;

extracting, by the one or more processors a reference point that is a reference of a position of the object to be measured in the interference image from the interference image;

when a displacement of the reference point from a plurality of the interference images is detected, correcting, by the one or more processors a luminance value for each pixel of the interference images in accordance with a displacement of the object to be measured indicated by a displacement of the reference point;

constructing, by the one or more processors an interferogram for each pixel indicating a luminance value for each pixel for a phase difference between the second light and the first light based on the luminance value for each pixel of the interference images after the correction; and obtaining, by the one or more processors information of a spectrum for each pixel from the interferogram; and using, by the one or more processors, a pixel having an envelope spectrum different from that of surrounding pixels as the reference point among the spectra for each pixel obtained from the interferogram generated for each pixel.

* * * * *